US011650983B2

(12) United States Patent
Chiba

(10) Patent No.: US 11,650,983 B2
(45) Date of Patent: *May 16, 2023

(54) SELECTING AN OPTIMAL COMBINATION OF SYSTEMS FOR QUERY PROCESSING

(71) Applicant: INTERNATIONAL BUSINESS MACHINES CORPORATION, Armonk, NY (US)

(72) Inventor: Tatsuhiro Chiba, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 125 days.

This patent is subject to a terminal disclaimer.

(21) Appl. No.: 17/131,119

(22) Filed: Dec. 22, 2020

(65) Prior Publication Data
US 2021/0109932 A1 Apr. 15, 2021

Related U.S. Application Data

(63) Continuation of application No. 15/920,954, filed on Mar. 14, 2018, now Pat. No. 10,915,529.

(51) Int. Cl.
G06F 16/2453 (2019.01)
G06F 16/2452 (2019.01)
(Continued)

(52) U.S. Cl.
CPC .. G06F 16/24545 (2019.01); G06F 16/24522 (2019.01); G06F 16/24547 (2019.01);
(Continued)

(58) Field of Classification Search
CPC ......... G06F 16/24545; G06F 16/24547; G06F 16/2453; G06F 16/24522
(Continued)

(56) References Cited

U.S. PATENT DOCUMENTS 7,392,185 B2* 6/2008 Bennett ............... G06F 16/3329
704/E15.047
8,126,870 B2* 2/2012 Chowdhuri ....... G06F 16/24532
707/713
(Continued)

FOREIGN PATENT DOCUMENTS

EP 3211548 8/2017

OTHER PUBLICATIONS

List of IBM Patents or Patent Applications Treated as Related dated Dec. 22, 2020, 2 pages.
(Continued)

Primary Examiner — Shahid A Alam
(74) Attorney, Agent, or Firm — Tutunjian & Bitetto, P.C.; Randy Emilio Tejeda

(57) ABSTRACT

A method is provided for generating a classification model configured to select an optimal execution combination for query processing. The method provides, to a processor, training queries and different execution combinations for executing the training queries. Each different execution combination involves a respective different query engine and a respective different runtime. The method extracts, from a set of Directed Acyclic Graphs (DAGs) using a set of Cost-Based Optimizers (CBOs), a set of feature vectors for each of the plurality of training queries. The method adds, by the processor to each of merged feature vectors a respective label indicative of the optimal execution combination based on actual respective execution times of the plurality of different execution combinations, to obtain a set of labels. The method trains, by the processor, the classification model by learning the set of merged feature vectors with the set of labels.

18 Claims, 8 Drawing Sheets

(51) Int. Cl.
*G06F 16/45* (2019.01)
*G06N 20/00* (2019.01)

(52) U.S. Cl.
CPC ......... *G06N 20/00* (2019.01); *G06F 16/2453* (2019.01); *G06F 16/45* (2019.01)

(58) Field of Classification Search
USPC ........................................................ 707/719
See application file for complete search history.

(56) References Cited

U.S. PATENT DOCUMENTS

| | | | |
|---|---|---|---|
| 9,524,520 B2* | 12/2016 | Tholiya | G06F 16/24578 |
| 10,510,007 B2* | 12/2019 | Singhal | G06F 16/90335 |
| 2003/0172059 A1* | 9/2003 | Andrei | G06F 16/24554 |
| | | | 707/999.003 |
| 2005/0071331 A1* | 3/2005 | Gao | G06F 16/24547 |
| 2006/0167865 A1* | 7/2006 | Andrei | G06F 16/24544 |
| | | | 707/999.004 |
| 2006/0218123 A1* | 9/2006 | Chowdhuri | G06F 16/24532 |
| 2008/0222093 A1* | 9/2008 | Fan | G06F 16/24545 |
| 2014/0156633 A1* | 6/2014 | Duan | G06F 16/9024 |
| | | | 707/713 |
| 2015/0154257 A1 | 6/2015 | Xiong et al. | |
| 2015/0339347 A1 | 11/2015 | Wiener et al. | |
| 2016/0034530 A1* | 2/2016 | Nguyen | G06F 16/24542 |
| | | | 707/719 |
| 2016/0239544 A1 | 8/2016 | Kondo et al. | |

OTHER PUBLICATIONS

Mell et al. "The NIST Definition of Cloud Computing", NIST Special Publication 800-145, 2011, 7 pages.

* cited by examiner

SELECTING AN OPTIMAL COMBINATION OF SYSTEMS FOR QUERY PROCESSING

BACKGROUND

Technical Field

The present invention relates generally to information processing and, in particular, to selecting an optimal combination of systems for query processing.

Description of the Related Art

Currently, there are many query engine/framework choices that can be selected and employed by a user. Such query engines/frameworks can include, but are not limited to, Spark, Tez®, Impara, Presto, and so forth. Similarly, execution runtimes can also involve several choices. Such execution runtimes can include, but are not limited to, JVM® (OpenJDK, Open J9, and so forth), and so forth. These frameworks and runtimes are widely used in recent big data processing eco-systems.

A system and runtime can be chosen for our analytical query workloads (e.g., Spark and OpenJDK, respectively). However, another system is rarely selected even if another system could achieve better performance (e.g., Tez and J9).

Hence, a problem exists in that no single combination of systems (i.e., a couple of query engines and JVM) is best for all queries. However, it is difficult to make a decision regarding which system should be used for a given query, since the decision can depend on factors including, but not limited to, the underlying system, configuration, characteristics of the query, engine and runtime, and so forth. Accordingly, there is a need for a way to select an optimum combination of systems for query processing.

SUMMARY

According to aspects of the present invention, a computer-implemented method is provided for generating a classification model configured to select an optimal execution combination for query processing. The method includes providing, to a processor, a plurality of training queries and a plurality of different execution combinations for executing the plurality of training queries. Each of the plurality of different execution combinations involve a respective one of a plurality of different query engines and a respective one of a plurality of different runtimes. The method further includes extracting, by the processor from a set of Directed Acyclic Graphs (DAGs) using a set of Cost-Based Optimizers (CBOs), a set of feature vectors for each of the plurality of training queries. The method also includes adding, by the processor to each of merged feature vectors a respective label indicative of the optimal execution combination based on actual respective execution times of the plurality of different execution combinations, to obtain a set of labels. The method additionally includes training, by the processor, the classification model by learning the set of merged feature vectors with the set of labels.

According to other aspects of the present invention, a computer program product is provided for generating a classification model configured to select an optimal execution combination for query processing. The computer program product includes a non-transitory computer readable storage medium having program instructions embodied therewith. The program instructions are executable by a processor of a computer to cause the computer to perform a method. The method includes providing, to a processor, a plurality of training queries and a plurality of different execution combinations for executing the plurality of training queries. Each of the plurality of different execution combinations involve a respective one of a plurality of different query engines and a respective one of a plurality of different runtimes. The method further includes extracting, by the processor from a set of Directed Acyclic Graphs (DAGs) using a set of Cost-Based Optimizers (CBOs), a set of feature vectors for each of the plurality of training queries. The method also includes adding, by the processor to each of merged feature vectors a respective label indicative of the optimal execution combination based on actual respective execution times of the plurality of different execution combinations, to obtain a set of labels. The method additionally includes training, by the processor, the classification model by learning the set of merged feature vectors with the set of labels.

According to yet other aspects of the present invention, a system is provided for generating a classification model configured to select an optimal execution combination for query processing. The system includes a processor, configured to access a plurality of training queries and a plurality of different execution combinations for executing the plurality of training queries. Each of the plurality of different execution combinations involve a respective one of a plurality of different query engines and a respective one of a plurality of different runtimes. The processor is further configured to extract, from a set of Directed Acyclic Graphs (DAGs) using a set of Cost-Based Optimizers (CBOs), a set of feature vectors for each of the plurality of training queries. The processor is also configured to add, to each of merged feature vectors, a respective label indicative of the optimal execution combination based on actual respective execution times of the plurality of different execution combinations, to obtain a set of labels. The processor is additionally configured to train the classification model by learning the set of merged feature vectors with the set of labels.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to selecting an optimum combination of systems for query processing.

In an embodiment, various execution combinations formed from a respective query engine (from among a set of different query engines) and a respective runtime (from among a set of different runtimes) are evaluated for a given query in order to select an optimal combination to execute the given query. In this way, each query can be processed by a most suitable execution combination from among a set of different execution combinations. Accordingly, various embodiments of the present invention can adaptively maximize query performance and can also minimize available cloud resources, among a myriad of other advantages readily apparent to one of ordinary skill in the art, given the teachings of the present invention provided herein.

Hence, in an embodiment, the present invention can involve two functions as follows: (1) creating a classification model; and (2) scheduling a query execution on a specified combination of available systems (query engines+runtimes), based on the classification model.

For creating a classification model, the present invention first gathers training data for supervised learning. The training data can include, for example, a set of feature vectors extracted from an execution plan Directed Acyclic Graph (DAG) generated by a Cost-Based-Optimizer (CBO) of a query engine (e.g., a catalyst from SparkSQL, a calcite from Hive, and so forth).

In an embodiment, the DAG can include various information (such as the number of maps, the number of reduces, the number of joins, the size of the input tables, execution order, etc.) relating to and/or otherwise implicated by the various execution combinations.

In an embodiment, the present invention can add labels (e.g., indicative of the most suitable combination) for the feature by testing all combinations, and then can train a classification model using the features and the labels.

In an embodiment relating to scheduling a query, a scheduler uses this classifier to predict what combination of systems are most suitable for a given query. Once the present invention receives a SQL, the system asks query engines for generating DAGs before query execution, which can be performed without actual execution (i.e. explain). The present invention then extracts feature vector from those DAGs and predicts a label with this classifier. Based on the prediction result, the present invention can launch a specified execution combination and submit the query to be executed according to the specified combination.

Figure 1:
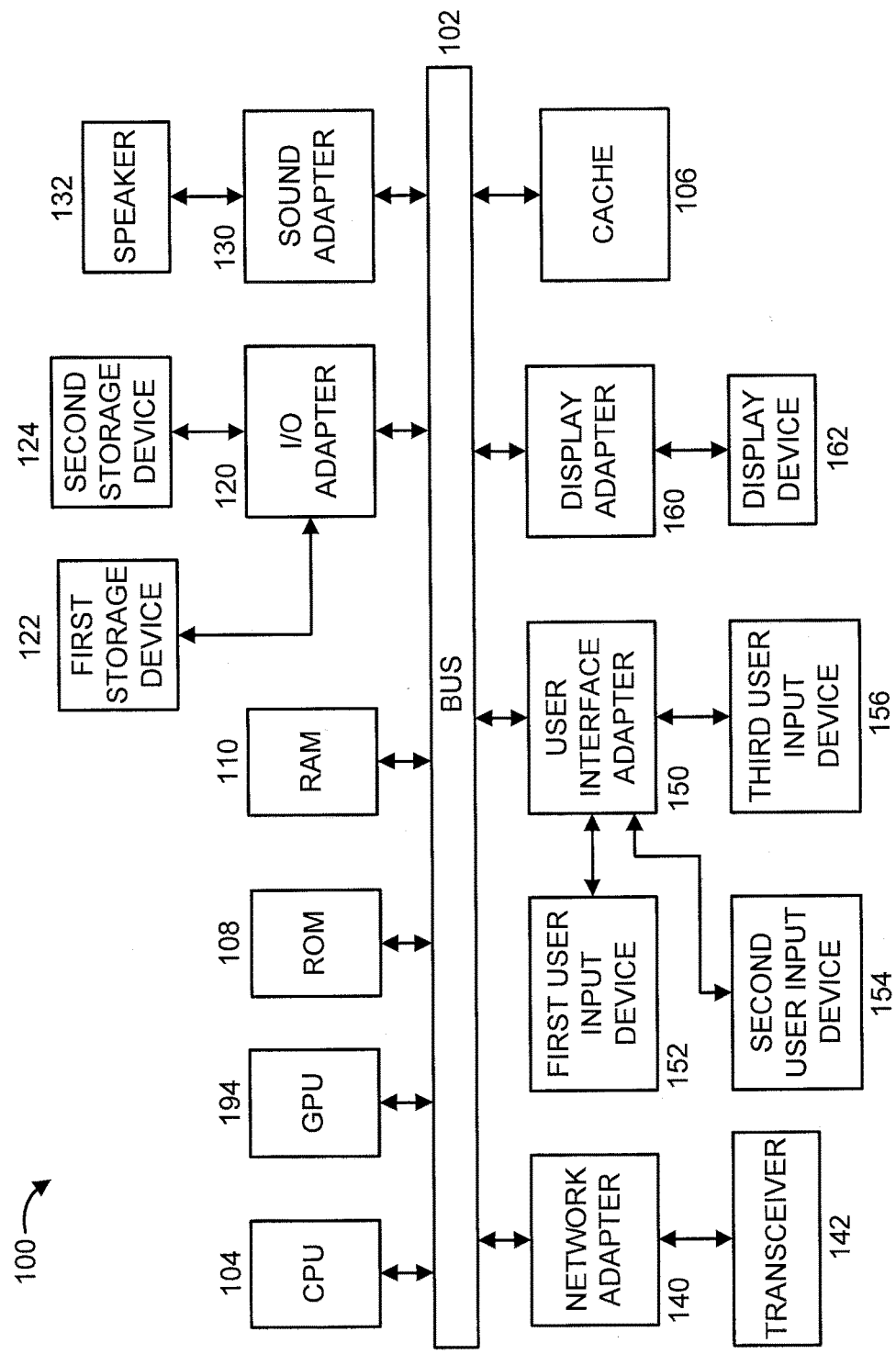
FIG. 1 is a block diagram showing an exemplary processing system to which the invention principles may be applied, in accordance with an embodiment of the present invention.

FIG. 1 is a block diagram showing an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
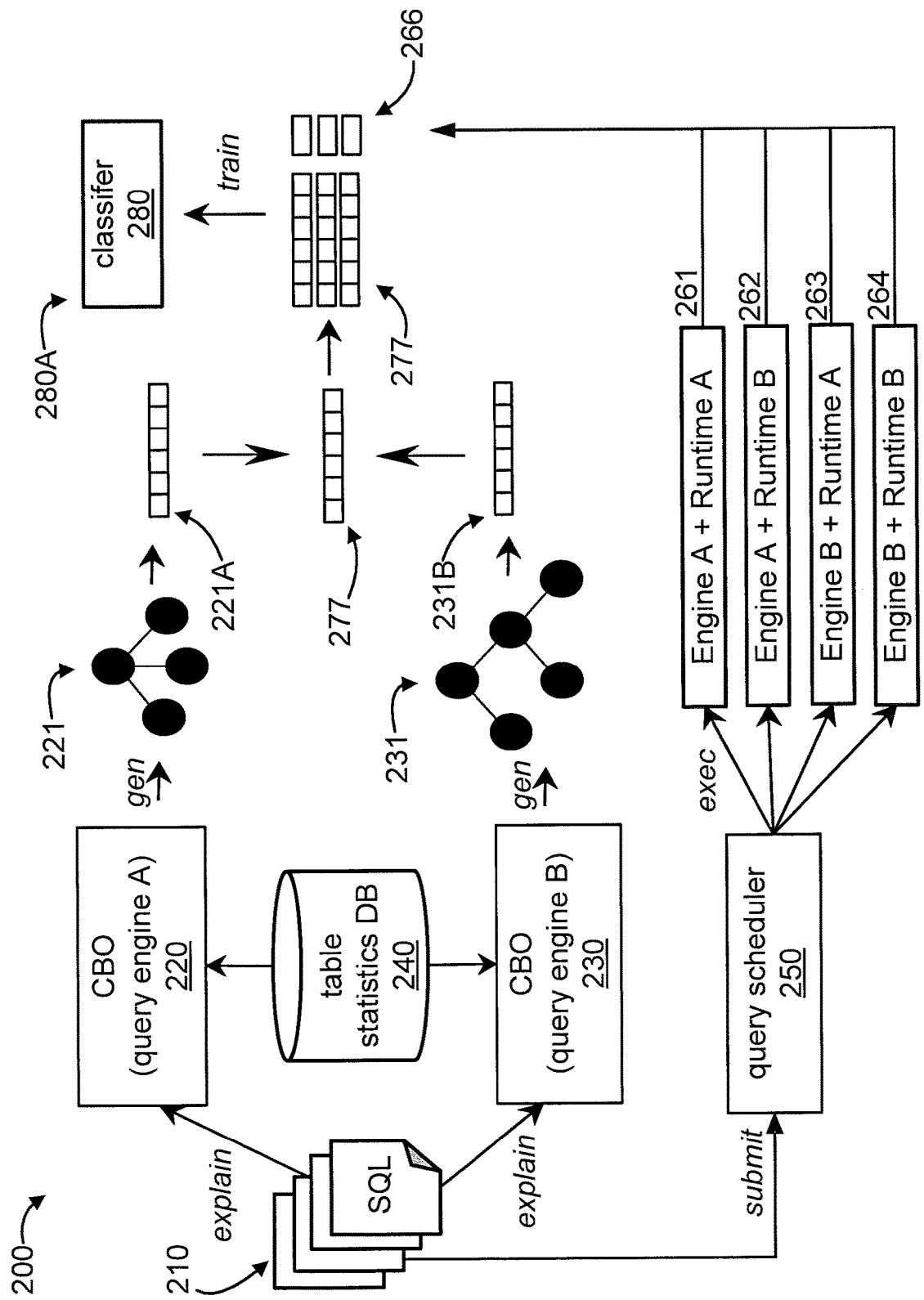
FIG. 2 is a block diagram showing an exemplary system, configured to select a combination of systems for query processing, in a training stage, in accordance with an embodiment of the present invention.
Figure 3:
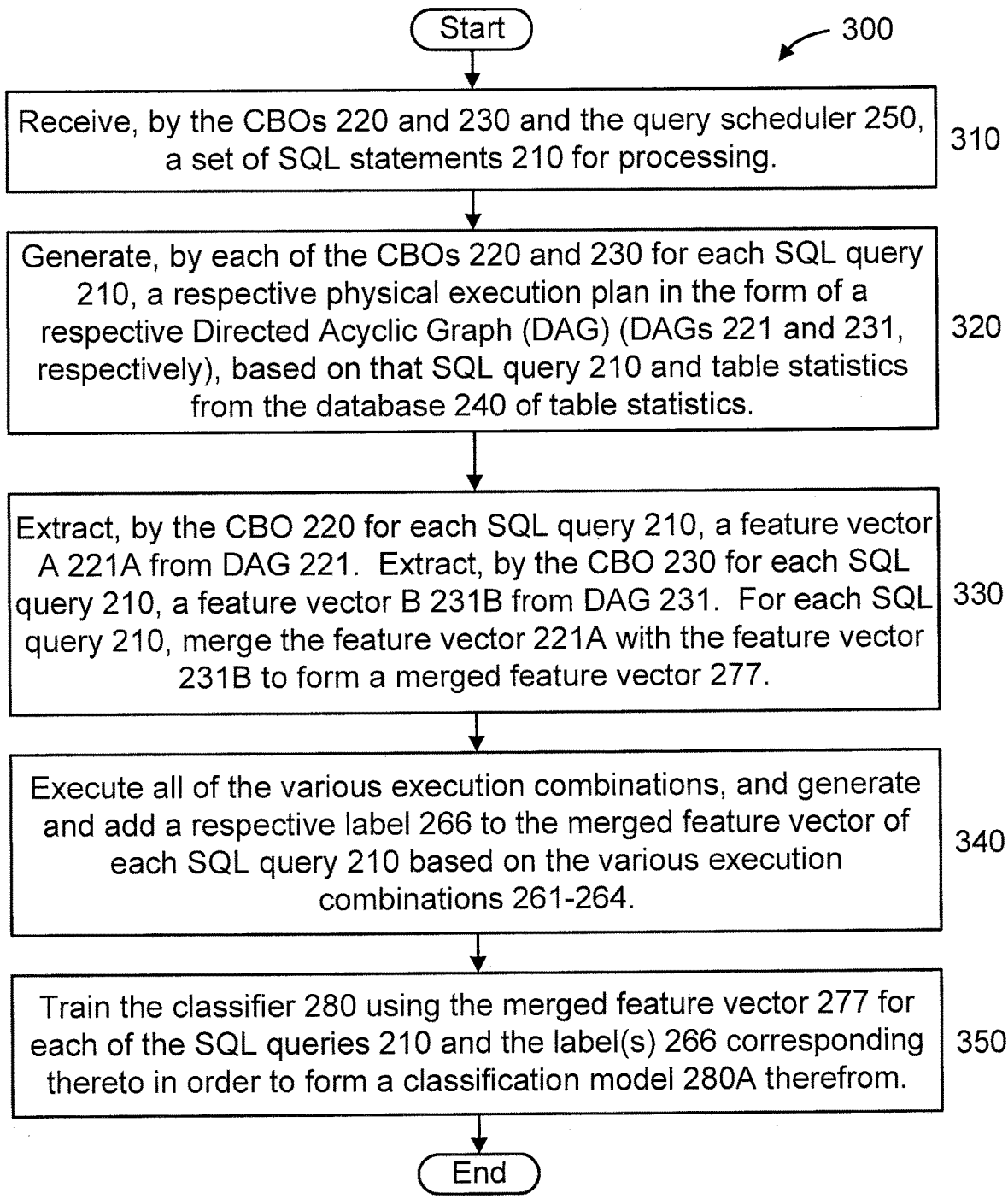
FIG. 3 is a flow diagram showing an exemplary method for training a system that is configured to select a combination of systems for query processing, in accordance with an embodiment of the present invention.

Moreover, it is to be appreciated that system 200 described below with respect to FIGS. 2 and 3 is a system for implementing respective embodiments of the present invention. Part or all of processing system 100 may be implemented in one or more of the elements of system 200.

Figure 5:
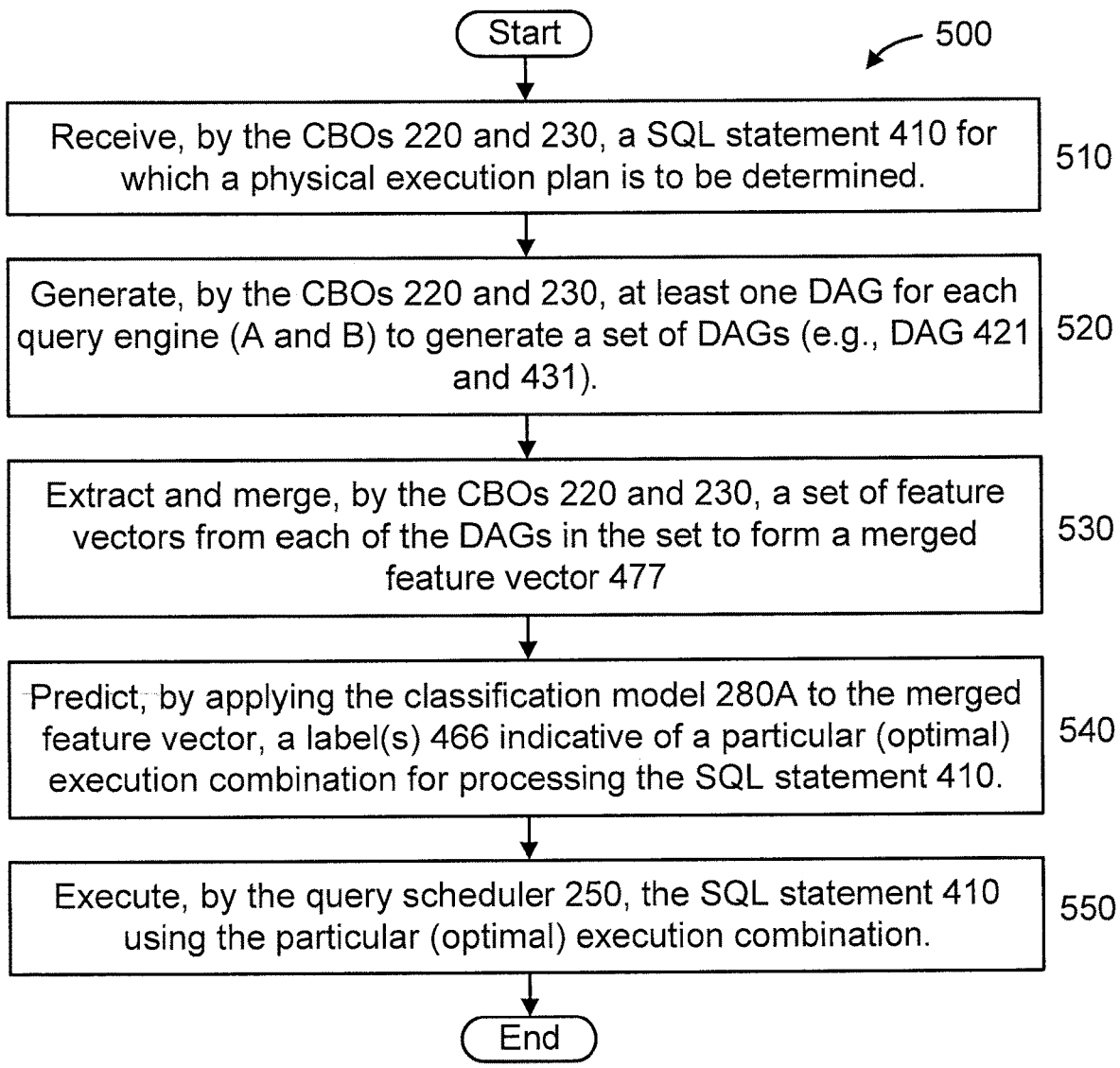
FIG. 5 is a flow diagram showing an exemplary method for scheduling query processing by selecting a combination of systems for query processing, in accordance with an embodiment of the present invention.

Further, it is to be appreciated that processing system 100 may perform at least part of the method described herein including, for example, at least part of method 300 of FIG. 3 and/or at least part of method 500 of FIG. 5. Similarly, part or all of system 200 may be used to perform at least part of method 300 of FIG. 3 and/or at least part of method 500 of FIG. 5.

FIG. 2 is a block diagram showing an exemplary system 200, configured to select a combination of systems (query engine+runtime) for query processing, in a training stage, in accordance with an embodiment of the present invention. FIG. 3 is a flow diagram showing an exemplary method 300 for training a system that is configured to select a combination of systems for query processing, in accordance with an embodiment of the present invention. In an embodiment, method 300 is performed by system 200, for example, by the elements of system 200 corresponding to the training stage as shown in FIG. 2.

The system 200 includes a Cost-Based-Optimizer (CBO) 220 for query engine A, a CBO 230 for query engine B, a database 240 of table statistics, a query scheduler 250, an execution portion 260, and a classifier 280. The system 200 receives a Structured Query Language (SQL) statement 210 as input.

The execution portion 260 includes the following four execution combinations for the sake of illustration (noting that other combinations are possible, while maintaining the spirit of the present invention):
(1) engine A+runtime A (referred to as execution combination 261);
(2) engine B+runtime B (referred to as execution combination 262);
(3) engine C+runtime A (referred to as execution combination 263); and
(4) engine B+runtime B (referred to as execution combination 264).

At block 310, receive, by the CBOs 220 and 230 and the query scheduler 250, a set of SQL statements 210 for processing (i.e., for training the classifier 280 to become a classification model 280A). In an embodiment, each of the SQL statements 210 provided to the CBOs 220 and 230 can be preceding by the word "explain" in order for the SQL statements 210 to behave like SQL queries (and hence are interchangeably referred to as "SQL queries" 210). In an embodiment, the SQL statements 210 provided to the query scheduler 250 can be preceded by the word "submit" in order to directly submit the SQL statement 210 to the query scheduler 250 for processing.

At block 320, generate (gen), by each of the CBOs 220 and 230 for each SQL query 210, a respective physical execution plan in the form of a respective Directed Acyclic Graph (DAG) (DAGs 221 and 231, respectively), based on that SQL query 210 and table statistics from the database 240 of table statistics. For each SQL query 210, the DAGs 221 and 231 can be generated to include various types of information relating to the various execution combinations including, but not limited to, the number of maps, the number of reduces, the number of joins, the size(s) of the input tables, execution time, execution order, and so forth that can be involved and/or otherwise implicated by the various execution combinations. The preceding various types of information can be obtained from the database 240 of table statistics. In an embodiment, each DAG represents a particular execution combination(s) involving a respective one of the query engines (A or B), such that DAG 221 always involves query engine A, and such that DAG 231 always involves query engine B, but each capable of using varying runtimes to form different combinations with these query engines.

At block 330, extract, by the CBO 220 for each SQL query 210, a feature vector A 221A from DAG 221. Also, extract, by the CBO 230 for each SQL query 210, a feature vector B 231B from DAG 231. Additionally, for each SQL query 210, merge the feature vector 221A with the feature vector 231B to form a merged feature vector 277. The merging can be performed by the CBOs 220 and 230. While this embodiment and others relating thereto described herein utilize the CBOs 220 and 230 to extract and merge feature vectors, in other embodiments, a set of feature vector extractors can be used to extract and merge feature vectors.

The merged feature vector 277 for each SQL query 210 can be used for creating/training a classification model 280A implemented by the classifier 280, as described herein below with respect to step 350. In an embodiment, the feature vector 221A for a particular SQL query 210 can include a set of features pertaining to all or part of the information in the DAG 221 corresponding to a particular execution combination(s) involving query engine A, and feature vector 231B for a particular SQL query 210 can include a set of feature pertaining to all or part of the information in the DAG 231 corresponding to a particular execution combination(s) involving query engine B. To the preceding end, while constrained to a particular query engine (A or B), each of the feature vectors 221a and 231B can include a set of features pertaining to information for one or more runtimes.

At block 340, execute (exec) all of the various execution combinations (e.g., execution combinations 261-264), and generate and add (and/or otherwise associate) a respective label 266 to the merged feature vector of each SQL query 210 based on the various execution combinations 261-264. In an embodiment, the label 266 can be indicative of the most suitable execution combination for each of the SQL queries 210 (and/or can include information relating to an ordering of the execution combinations, e.g., from best to worst (e.g., fastest to slowest, least computationally expensive to most computationally expensive, and so forth)) and can be associated with the merged feature vector 277 obtained for that SQL query 210. In an embodiment, each label 266 can correspond to a feature (query engine and/or runtime feature) that, in turn, corresponds to a particular execution combination (from among execution combinations 261-264). In an embodiment, each label 266 can be based on the execution time of (i.e., the time it takes to execute) a respective one of the execution combinations and/or other parameters (e.g., computational expense, etc.).

At block 350, train the classifier 280 using the merged feature vector 277 for each of the SQL queries 210 and the label(s) 266 corresponding thereto in order to form a classification model 280A therefrom. The figure reference numeral 280 is thus used herein to refer to an untrained classifier/classification model, while the figure reference numeral 280A is used herein to refer to a trained classifier/classification model. In an embodiment, the classifier 280 is trained to become the classification model 280A by learning the merged feature vector 277 and corresponding label(s) 266 for each of the SQL queries 210.

In the embodiment shown in FIG. 2, the elements thereof are interconnected by a bus(es)/network(s) (not specifically shown). However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

Figure 4:
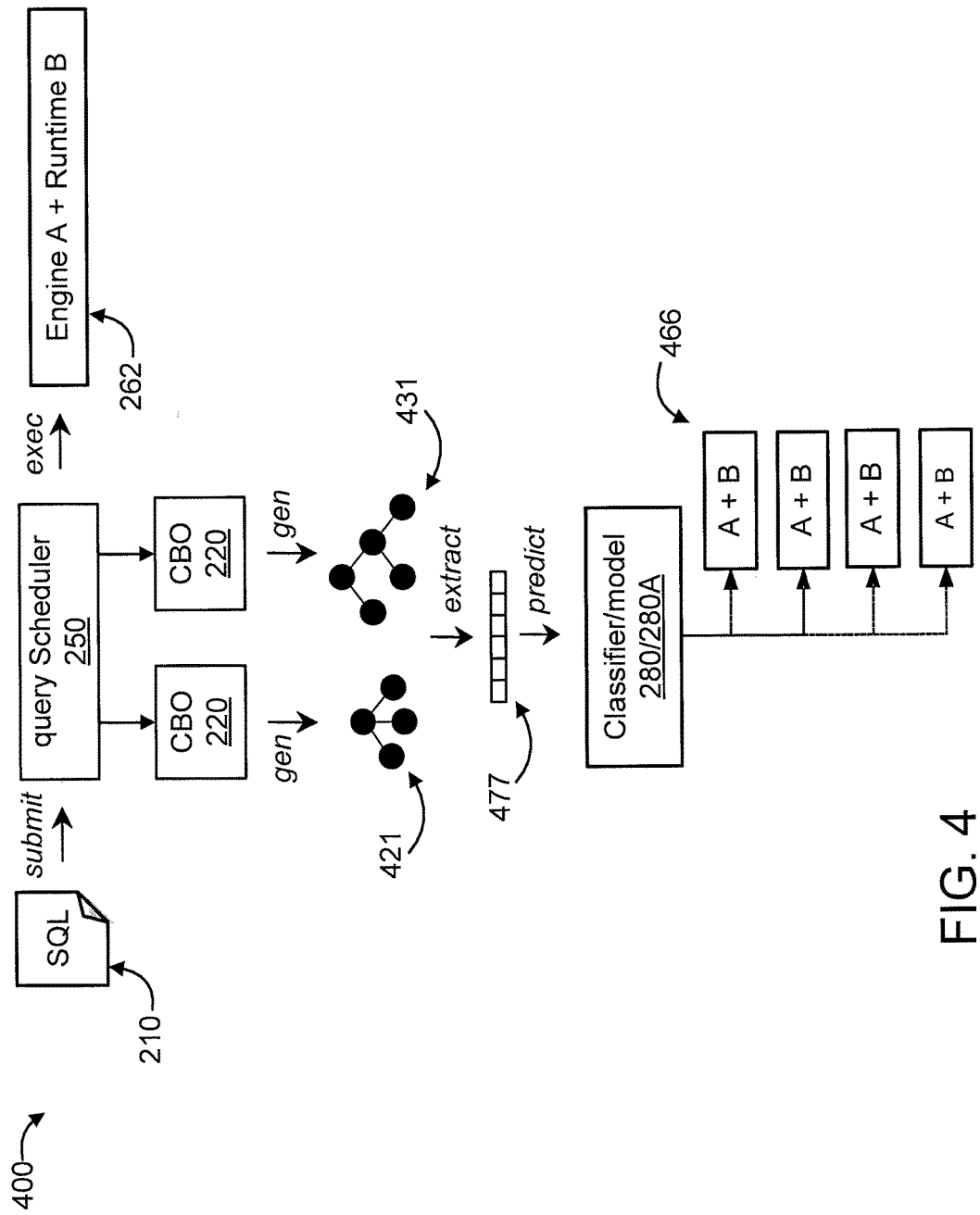
FIG. 4 is a block diagram further showing the system of FIG. 2, in a scheduling stage, in accordance with an embodiment of the present invention.

FIG. 4 is a block diagram further showing the system 200 of FIG. 2, in a scheduling stage, in accordance with an embodiment of the present invention. FIG. 5 is a flow diagram showing an exemplary method 500 for scheduling query processing by selecting a combination of systems for query processing, in accordance with an embodiment of the present invention. In an embodiment, method 500 is performed by system 200, for example, by the elements of system 200 corresponding to the scheduling stage as shown in FIG. 4.

In FIG. 4, the scheduling stage involves the following elements of system 200 of FIG. 2: the query scheduler 250; the CBOs 220 and 230; and the classifier 280.

At block 510, receive, by the CBOs 220 and 230, a SQL statement 410 for which a physical execution plan is to be determined (i.e., a particular one of the various execution combinations is to be selected). In an embodiment, the SQL statement 410 provided to the query scheduler 250 can be preceded by the word "explain" in order for the SQL statement 410 to behave like a SQL query (and hence is interchangeably referred to as "SQL query" 410).

At block 520, generate, by the CBOs 220 and 230, at least one DAG for each query engine (A and B) to generate a set of DAGs (e.g., DAG 421 and 431). In an embodiment, the DAG(s) for each query engine can involve multiple different runtimes. In an embodiment, the set of DAGs can be generated before/without execution of the involved execution combinations.

At block 530, extract and merge, by the CBOs 220 and 230, a set of feature vectors from each of the DAGs in the set to form a merged feature vector 477. Each of the feature vectors can correspond to a particular execution combination (query engine+runtime).

At block 540, predict, by applying the classification model 280A to the merged feature vector, a label(s) 466 indicative of a particular (optimal) execution combination for processing the SQL statement 410.

At block 550, execute, by the query scheduler 250, the SQL statement 410 using the particular (optimal) execution combination. In this example, the particular (optimal) execution combination is engine A+runtime B, as evidenced from the labels 266 (A+B).

Figure 6:
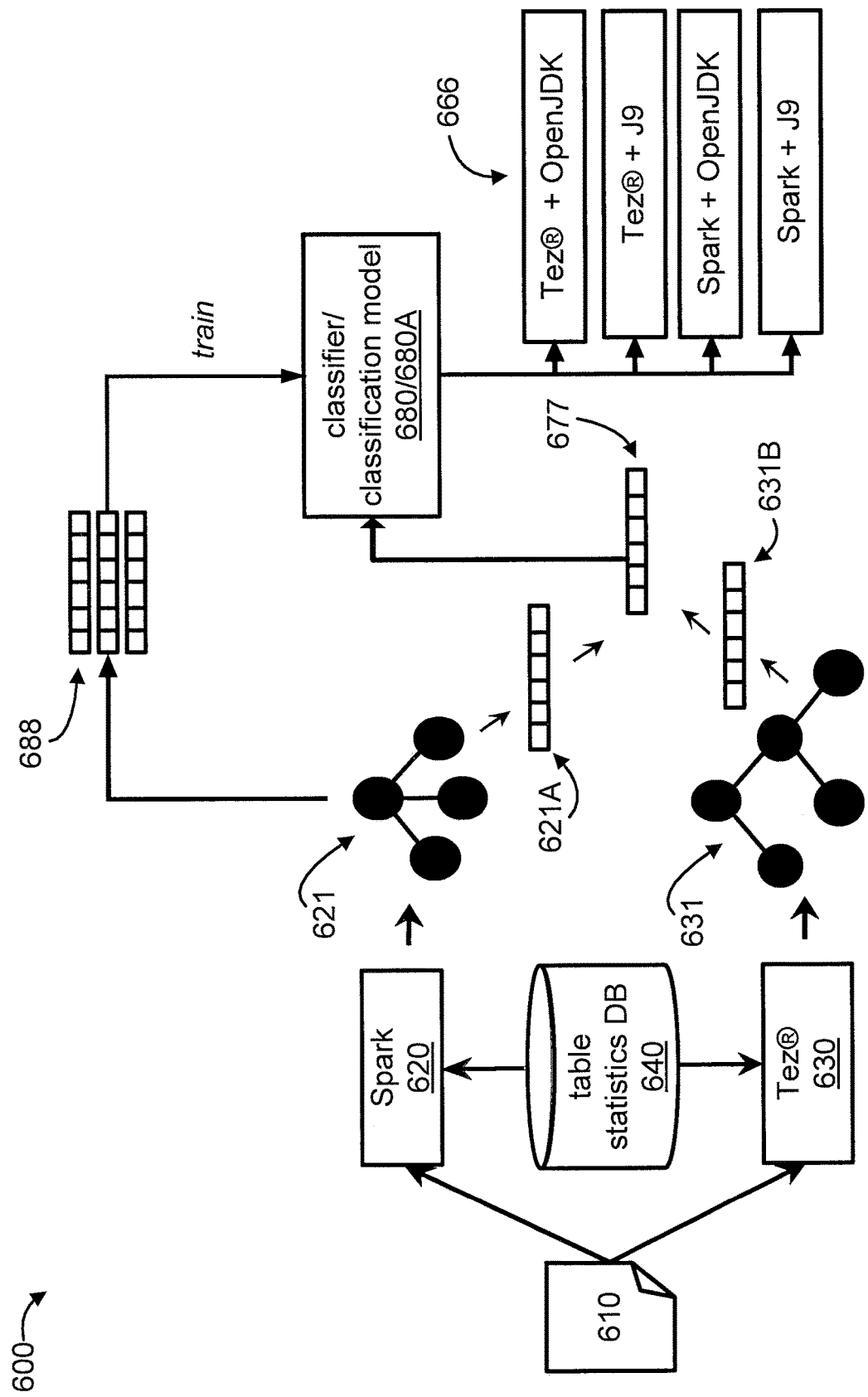
FIG. 6 is a block diagram showing another exemplary system, configured to select a combination of systems for query processing, in accordance with an embodiment of the present invention.

FIG. 6 is a block diagram showing another exemplary system 600, configured to select a combination of systems for query processing, in accordance with an embodiment of the present invention. System 600 can be considered a more specific example of system 200 as shown in FIGS. 2 and 4, where specific examples of certain query engines and runtimes are employed. Moreover, system 600 is shown mixing various aspects from the training and scheduling stages relating to the embodiments shown in FIGS. 2 and 4.

System 600 includes a Cost-Based-Optimizer (CBO) 620 for a Spark query engine, a CBO for a Tez query engine 630, a database 640 of table statistics, and a classifier/classification model 680/680A.

A SQL statement 610 is received by the CBOs 620 and 630, which then generate respective DAGs 621 and 631 for each query engine (i.e., Spark and Tez). A feature vector (621A and 631B, respectively) is extracted from each of the DAGs 621 and 631 that is specific to a particular engine (i.e., the top DAG 621 is specific to Spark and the bottom DAG 631 is specific to Tez). The feature vector for each query engine (621A and 631B) is merged to obtain a merged feature vector 677. The classifier 680 is trained using, for example, the execution history 688 relating to (the information in) the DAGs 621 and 631 in order to form a classification model 680A. The execution history 688 can be in the form of previously determined merged feature vectors and labels for various different execution combinations. The trained classifier, that is, the classification model 680A then predicts labels 666 for the SQL statement 610 as follows: Tez®+OpenJDK; Tez®+J9; Spark+OpenJDK; and Spark+J9. The preceding labels can be provided in a particular order when order position indicates optimality of a given execution combination.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
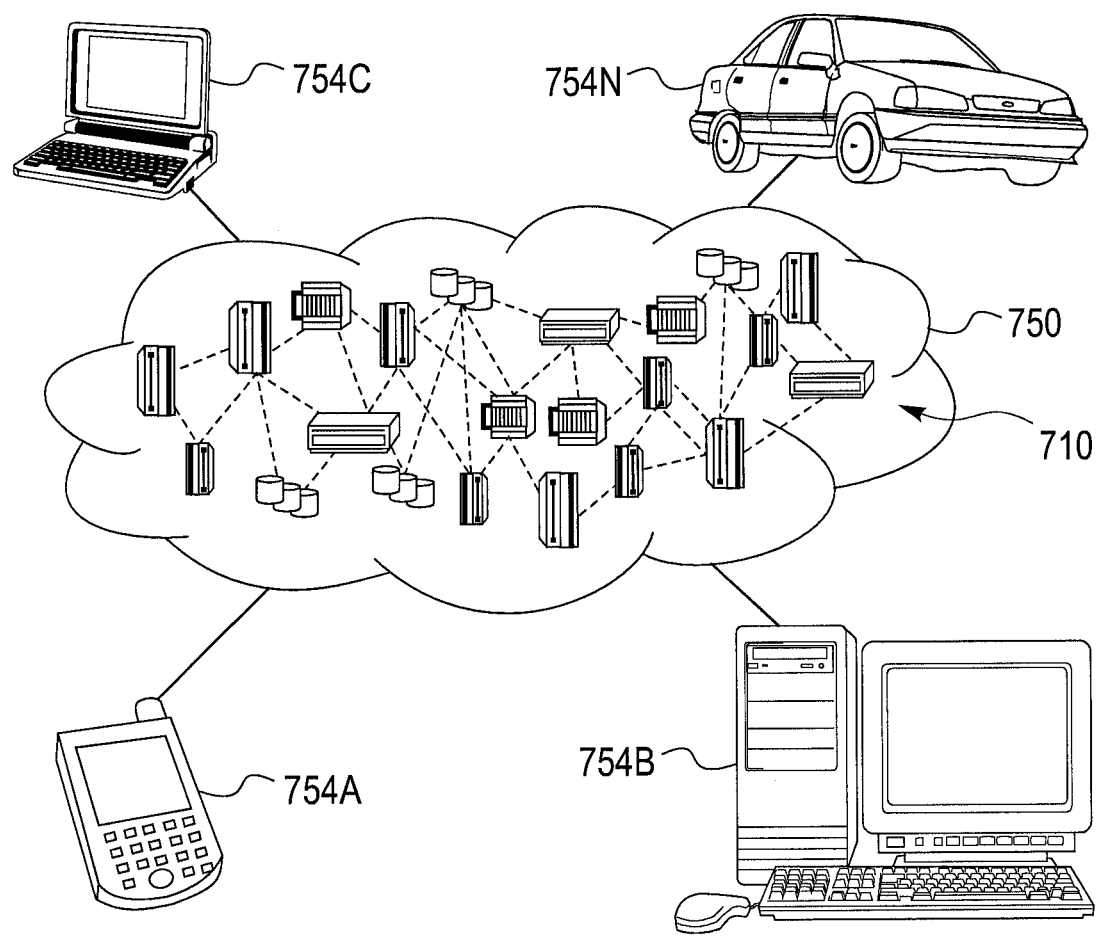
FIG. 7 shows a cloud computing environment, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
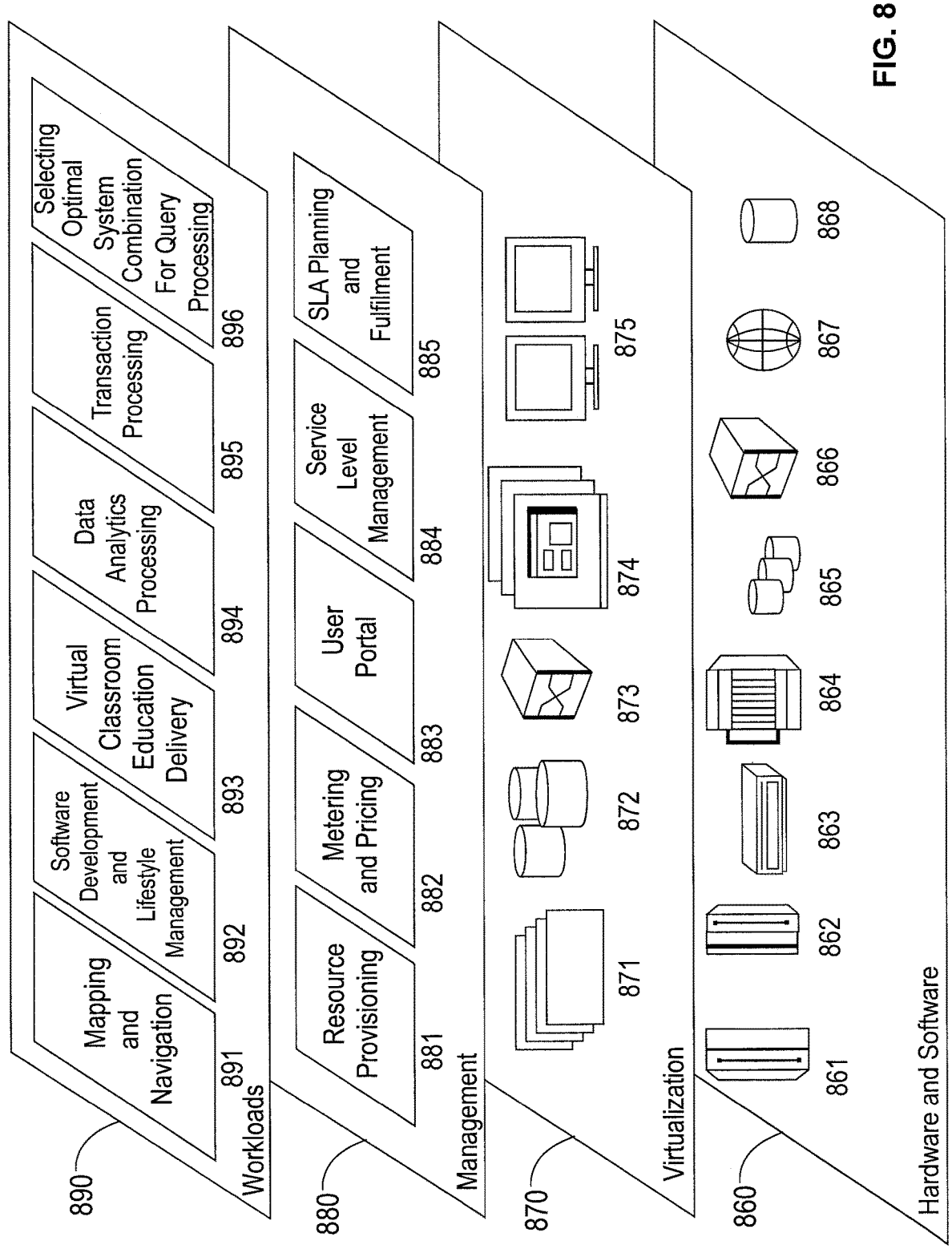
FIG. 8 shows abstraction model layers, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and optimum system combination selection for query processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for generating a classification model configured to select an optimal execution combination for query processing, comprising:
    providing, to a processor, a plurality of training queries and a plurality of different execution combinations for executing the plurality of training queries, each of the plurality of different execution combinations involving a respective one of a plurality of different query engines and a respective one of a plurality of different runtimes;
    extracting, by the processor from a set of Directed Acyclic Graphs using a set of Cost-Based Optimizers (CBOs), at least two feature vectors for a new query;
    merging the at least two feature vectors to form a new merged feature vector;
    outputting a label for the new query by classifying the new merged feature vector using the classification model, the label indicating the optimal execution combination for the new query; and
    executing the optimal execution combination for the new query.

2. The computer-implemented method of claim 1, wherein the set of DAGs is generated by the CBOs for the each of the plurality of training queries.

3. The computer-implemented method of claim 2, wherein each of the CBOs is constrained to a respective different one of the plurality of query engines.

4. The computer-implemented method of claim 2, wherein each of the DAGs comprise a number of maps, a number of reduces, a number of joins, an input table size, an execution time, and an execution order, relating to a respective one of the plurality of execution combinations.

5. The computer-implemented method of claim 2, wherein each of the DAGs are generated by the CBOs and a database of table statistics pertaining to the plurality of execution combinations.

6. The computer-implemented method of claim 1, wherein each of the feature vectors comprise at least one feature, relating to a respective one of the plurality of execution combinations, and selected from the group consisting of a number of maps, a number of reduces, a number of joins, an input table size, an execution time, and an execution order.

7. The computer-implemented method of claim 1, wherein the at least two feature vectors for the new query is extracted from a set of Directed Acyclic Graphs (DAGs) generated by the CBOs for the new query.

8. The computer-implemented method of claim 1, wherein the optimal execution combination is determined for the new query prior to an execution of the optical execution combination for the new query.

9. The computer-implemented method of claim 1, wherein the plurality of training queries are Structured Query Language (SQL) queries.

10. The computer-implemented method of claim 1, wherein at least a portion of the method is implemented using a cloud architecture, and wherein the optimal execution combination is determined so as to minimize a use of available resources in the cloud architecture.

11. The computer-implemented method of claim 1, wherein the method further comprises:
    extracting, by the processor from a set of Directed Acyclic Graphs (DAGs) using a set of Cost-Based Optimizers (CBOs), a set of feature vectors for each of the plurality of training queries;
    adding, by the processor to each of merged feature vectors, a respective label indicative of the optimal execution combination based on actual respective execution times of the plurality of different execution combinations, to obtain a set of labels; and
    training, by the processor, the classification model by learning the set of merged feature vectors with the set of labels.

12. A computer program product for generating a classification model configured to select an optimal execution combination for query processing, the computer program product comprising a non-transitory computer readable storage medium having program instructions embodied therewith, the program instructions executable by a processor of a computer to cause the computer to perform a method comprising:
    providing, to the processor, a plurality of training queries and a plurality of different execution combinations for executing the plurality of training queries, each of the plurality of different execution combinations involving a respective one of a plurality of different query engines and a respective one of a plurality of different runtimes;
    extracting, by the processor from a set of Directed Acyclic Graphs using a set of Cost-Based Optimizers (CBOs), at least two feature vectors for a new query;
    merging the at least two feature vectors to form a new merged feature vector;
    outputting a label for the new query by classifying the new merged feature vector using the classification model, the label indicating the optimal execution combination for the new query; and
    executing the optimal execution combination for the new query.

13. The computer program product of claim 12, wherein the set of DAGs is generated by the CBOs for the each of the plurality of training queries.

14. The computer program product of claim 13, wherein each of the CBOs is constrained to a respective different one of the plurality of query engines.

15. The computer program product of claim 13, wherein each of the DAGs comprise a number of maps, a number of reduces, a number of joins, an input table size, an execution time, and an execution order, relating to a respective one of the plurality of execution combinations.

16. The computer program product of claim 12, further comprising:
    extracting, by the processor from a set of Directed Acyclic Graphs (DAGs) using a set of Cost-Based Optimizers (CBOs), a set of feature vectors for each of the plurality of training queries;
    adding, by the processor to each of merged feature vectors a respective label indicative of the optimal execution combination based on actual respective execution times of the plurality of different execution combinations, to obtain a set of labels; and training, by the processor, the classification model by learning the set of merged feature vectors with the set of labels.

17. A system for generating a classification model configured to select an optimal execution combination for query processing, comprising:
a processor, configured to
 access a plurality of training queries and a plurality of different execution combinations for executing the plurality of training queries, each of the plurality of different execution combinations involving a respective one of a plurality of different query engines and a respective one of a plurality of different runtimes;
 extracting, from a set of Directed Acyclic Graphs using a set of Cost-Based Optimizers (CBOs), at least two feature vectors for a new query;
 merging the at least two feature vectors to form a new merged feature vector;
 outputting a label for the new query by classifying the new merged feature vector using the classification model, the label indicating the optimal execution combination for the new query; and
 executing the optimal execution combination for the new query.

18. The system of claim 17, wherein the processor is further configured to:
extract, from a set of Directed Acyclic Graphs (DAGs) using a set of Cost-Based Optimizers (CBOs), a set of feature vectors for each of the plurality of training queries;
add, to each of merged feature vectors, a respective label indicative of the optimal execution combination based on actual respective execution times of the plurality of different execution combinations, to obtain a set of labels; and
train the classification model by learning the set of merged feature vectors with the set of labels.

* * * * *